Patented Dec. 18, 1928.

1,696,022

UNITED STATES PATENT OFFICE.

ELLIOTT ROSS WEYER, OF WASHINGTON, PENNSYLVANIA.

FERMENTATION PROCESS.

No Drawing.   Application filed March 4, 1927. Serial No. 172,934.

My invention relates to improvements in the fermentation of carbohydrate mashes; particularly in the sterilization of such mashes and the preservation of the purity of culture during the fermentation process. My invention is of special value and application in connection with fermentation processes for the manufacture of butyl alcohol and acetone. Improvement in yield of the desired products and expedition of the manufacturing operation are among the important advantages of my invention. The production of butyl alcohol and acetone, for example, through the fermentation of various carbohydrate materials, is dependent upon the fermentative activities of a certain type of bacteria. In the operation of the fermentation process, it is important that purity of culture be preserved, otherwise the yield of desired products may be decreased, or in extreme cases there may be no yield, through the activities of certain undesirable organisms. Such contaminating organisms, which are commonly associated with cereal grains and often found in the soil and in the air, are rapid growers and are resistant to heat.

Hitherto it has been common practice to cook, for extended periods, all mash for use, to use the same example, in the production of butyl alcohol and acetone. The cooking is intended to gelatinize the starch which is present and to rid the mash of all bacteria before it is inoculated with a pure culture of the organism used to produce the butyl alcohol and acetone. Only a short period of cooking is necessary completely to gelatinize starch present in the mash. On the other hand, the cooking necessary to kill off all foreign organisms present is long and retards the manufacturing operation. Again, in the processes hitherto used, it has been found difficult if not impossible to preserve the sterility of the prepared mash and to preserve the purity of culture after inoculation. In order to guard against such difficulties, it has been common practice to have all parts of the equipment used in the manufacturing operation fitted with facilities for sterilization by live steam and to provide, at all points where danger from contamination is present, for example, at valves and bushings, glands impregnated with strong antiseptic solutions. In spite of such precautions, contamination of greater or less moment is often experienced.

I have discovered that sterilization can be promoted and contamination avoided or minimized by subjecting the mash to treatment with bacteriocidal and bacteriostatic substances exerting a selective action, permitting activity of selected cultures, but inhibiting activity of any contaminants, and, according to my invention, I treat the mash to be subjected to the fermentation process with such an antiseptic substance, non-toxic with respect to the selected culture, but toxic with respect to contaminating organisms.

I have discovered, again to refer to the same example, that bacteriocidal and bacteriostatic substances such as butyl resorcinol and butyl phenol, and their homologues and similar compounds, exert a selective bacteriocidal and bacteriostatic action which makes their use particularly advantageous in the treatment of carbohydrate mashes in the manufacture by fermentation processes of butyl alcohol and acetone.

Butyl resorcinol, for example, is a substance highly toxic with respect to most bacteria, exerting a bacteriostatic action in dilutions of 1:50,000 or even greater dilutions, but this substance, in such concentrations, or even in greater concentrations, has little, if any, effect upon the bacteria active in the production of butyl alcohol and acetone.

The normally high toxicity of butyl resorcinol and butyl phenol, for example, is partly due to the butyl radical, and it may be that the relative non-toxicity of such butyl derivatives with respect to cultures active in the fermentation of carbohydrate mashes to produce butyl alcohol is due, in this instance, to the fact that these substances contain as their principal toxic component a radical common to a product of the fermentation resulting from the activity of these bacteria.

As an example of one application of my invention: I add, to the water, carbohydrate and other materials used to make up a mash in the ordinary way, a small quantity of an antiseptic substance exerting the desired selective action. For example, in the manufacture of butyl alcohol and acetone, I may add to the mash an amount of butyl resorcinol sufficient to make the final concentration with respect to this substance about 1:50,000 by weight. The mash may then be cooked in the usual manner. Following such treatment it will be found that the time necessary for complete sterilization of the mash is considerably shortened. Likewise, after sterilization, the mash is resistant to contamination due to the antiseptic which it contains. The mash may then be used either for the preparation of "seed culture," stock culture, or for the fermentation in the manufacturing operation in the usual way.

The antiseptic substance may be added to the mash either before or during sterilization; in either case it exerts its action during and subsequent to sterilization. Addition of the antiseptic after sterilization or after partial sterilization is also useful in connection with such fermentation processes. Added after sterilization or after partial sterilization, the antiseptic acts as a preservative of pure culture during fermentation and reduces to a minimum the activity of any undesirable contaminants. I have also found that in the presence of substances exerting such selective bacteriostatic action, for example, butyl resorcinol in fermentation to produce butyl alcohol and acetone, absolute purity of culture is not essential and that organisms which otherwise might act as contaminants can, to some extent, be present without detriment to the operation of the fermentation process.

I claim:

1. An improvement in the fermentation of carbohydrate mashes with selected cultures for the production of butyl alcohol and acetone, which comprises sterilizing the mash and treating the sterilized mash with an antiseptic non-toxic with respect to cultures active in this fermentation but toxic with respect to contaminating organisms.

2. An improvement in the fermentation of carbohydrate mashes with selected cultures for the production of butyl alcohol and acetone which comprises treating the mash with an antiseptic non-toxic with respect to cultures active in this fermentation but toxic with respect to contaminating organisms and sterilizing the treated mash.

3. An improvement in the fermentation of carbohydrate mashes with selected cultures for the production of butyl alcohol and acetone which comprises treating the mash during sterilization with an antiseptic non-toxic with respect to cultures active in this fermentation but toxic with respect to contaminating organisms.

4. An improvement in the fermentation of carbohydrate mashes with selected cultures for the production of butyl alcohol and acetone which comprises treating the mash with an antiseptic non-toxic with respect to cultures active in this fermentation but toxic with respect to contaminating organisms.

5. An improvement in the fermentation of carbohydrate mashes with selected cultures for the production of butyl alcohol and acetone which comprises treating the mash with a bacteriocidal and bacteriostatic substance containing as a major toxic component a butyl phenol.

In testimony whereof I affix my signature.

ELLIOTT ROSS WEYER.